(12) United States Patent
Wang

(10) Patent No.: US 10,573,115 B2
(45) Date of Patent: Feb. 25, 2020

(54) CLOUD COIN SLOT DEVICE CAPABLE OF SUPPORTING A THIRD PARTY PAYMENT FUNCTION

(71) Applicant: LEADOT INNOVATION, INC., Kaohsiung (TW)

(72) Inventor: Justin Wang, Taipei (TW)

(73) Assignee: LEADOT INNOVATION, INC., Kaohsiung (TW)

( * ) Notice: Subject to any disclaimer, the term of this patent is extended or adjusted under 35 U.S.C. 154(b) by 71 days.

(21) Appl. No.: 15/403,196

(22) Filed: Jan. 11, 2017

(65) Prior Publication Data

US 2017/0213412 A1 Jul. 27, 2017

(30) Foreign Application Priority Data

Jan. 21, 2016 (TW) .............................. 105101834 A

(51) Int. Cl.
| | |
|---|---|
| *G07F 9/10* | (2006.01) |
| *G06Q 20/18* | (2012.01) |
| *G06Q 20/32* | (2012.01) |
| *G07F 7/08* | (2006.01) |
| *G06K 19/06* | (2006.01) |
| *G06Q 20/20* | (2012.01) |

(Continued)

(52) U.S. Cl.
CPC .......... *G07F 9/10* (2013.01); *G06K 19/06037* (2013.01); *G06Q 20/18* (2013.01); *G06Q 20/202* (2013.01); *G06Q 20/3276* (2013.01); *G06Q 20/3278* (2013.01); *G07F 7/0893* (2013.01); *G07F 9/006* (2013.01); *G07F 9/04* (2013.01)

(58) Field of Classification Search
CPC .......... G07F 9/10; G07F 7/0893; G07F 9/006; G07F 9/04; G06Q 20/3278; G06Q 20/3276; G06Q 20/18; G06Q 20/202; G06K 19/06037

See application file for complete search history.

(56) References Cited

U.S. PATENT DOCUMENTS

| | | | |
|---|---|---|---|
| 4,341,951 A * | 7/1982 | Benton .................. | G06Q 20/10 235/379 |
| 8,345,835 B1 * | 1/2013 | Or-Bach ............ | G06Q 30/0269 379/114.13 |

(Continued)

FOREIGN PATENT DOCUMENTS

| | | |
|---|---|---|
| CN | 104063790 A | 9/2014 |
| CN | 104715545 A | 6/2015 |

(Continued)

*Primary Examiner* — Nathan A Mitchell
(74) *Attorney, Agent, or Firm* — Winston Hsu

(57) ABSTRACT

A cloud coin slot device includes a panel device, a processor, a memory, and a transceiver. The panel device includes a screen, a plurality of seven-segment displays, a plurality of control keys, and an enter key. The screen is used for displaying an identifier image. The plurality of seven-segment displays is used for displaying a payment value. The plurality of control keys is used for inputting the payment value. The enter key is used for confirming the payment value. The processor is coupled to the panel device for processing payment data. The memory is coupled to the processor for saving data of a payment program. The transceiver is coupled to the processor for receiving the payment data transmitted from a server.

14 Claims, 17 Drawing Sheets

(51) Int. Cl.
*G07F 9/00* (2006.01)
*G07F 9/04* (2006.01)

(56) References Cited

U.S. PATENT DOCUMENTS

| | | | |
|---|---|---|---|
| 2003/0149663 A1 | 8/2003 | Vonholm | |
| 2005/0102233 A1* | 5/2005 | Park | G06Q 20/16 705/44 |
| 2007/0125620 A1* | 6/2007 | Sorenson | G06Q 20/123 194/217 |
| 2008/0255894 A1* | 10/2008 | Falls | G06Q 10/087 705/400 |
| 2011/0213711 A1* | 9/2011 | Skinner | G06F 21/43 705/71 |
| 2013/0035787 A1 | 2/2013 | Canter | |
| 2013/0168447 A1* | 7/2013 | Little | G06Q 10/00 235/378 |
| 2014/0032412 A1* | 1/2014 | Park | G06Q 20/18 705/44 |
| 2014/0114856 A1* | 4/2014 | Jung | G06Q 20/3278 705/44 |
| 2014/0188703 A1* | 7/2014 | Tse | G06Q 20/12 705/39 |
| 2014/0278965 A1* | 9/2014 | Douglas | G06Q 20/227 705/14.51 |
| 2014/0293598 A1* | 10/2014 | Bruck | F21V 33/00 362/234 |
| 2014/0358705 A1 | 12/2014 | Harrington | |
| 2014/0380508 A1* | 12/2014 | Cao | H04L 63/08 726/28 |
| 2015/0149263 A1 | 5/2015 | Stenneth | |
| 2015/0178721 A1 | 6/2015 | Pandiarajan | |
| 2015/0302371 A1* | 10/2015 | Tamagushi | G06Q 20/0655 705/41 |
| 2016/0260075 A1* | 9/2016 | deKozan | G06Q 20/28 |
| 2016/0314453 A1* | 10/2016 | Rogers | G06Q 20/327 |
| 2017/0213412 A1 | 7/2017 | Wang | |

FOREIGN PATENT DOCUMENTS

| | | |
|---|---|---|
| CN | 204833431 U | 12/2015 |
| CN | 206672232 U | 11/2017 |
| DE | 102 59 454 A1 | 7/2004 |
| EP | 1 622 104 A2 | 2/2006 |
| EP | 2 549 449 A2 | 1/2013 |
| JP | 2002-92701 A | 3/2002 |
| JP | 2002-216238 A | 8/2002 |
| JP | 2002-251653 A | 9/2002 |
| JP | 2003-14614 A | 1/2003 |
| JP | 2003-141614 A | 5/2003 |
| JP | 2003-529152 A | 9/2003 |
| JP | 2004-30167 A | 1/2004 |
| JP | 2005-352791 A | 12/2005 |
| TW | M434276 U1 | 7/2012 |
| TW | M456556 U1 | 7/2013 |
| TW | 201503026 A | 1/2015 |
| WO | 2012/088512 A2 | 6/2012 |
| WO | 2013/100905 A1 | 7/2013 |
| WO | 2015039568 A1 | 3/2015 |

* cited by examiner

CLOUD COIN SLOT DEVICE CAPABLE OF SUPPORTING A THIRD PARTY PAYMENT FUNCTION

BACKGROUND OF THE INVENTION

1. Field of the Invention

The present invention illustrates a cloud coin slot device, and more particularly, the cloud coin slot device capable of supporting a third party payment function.

2. Description of the Prior Art

With advancement of techniques, various methods for exchanging daily commodities are introduced with high convenience. Nowadays, many coin slot devices, ticket vending machines, and lottery machines are located everywhere. A user can use a payment mechanism by manually inserting coins into a corresponding coin slot of the coin slot device for exchanging products.

However, conventional coin slot devices use a coin insertion mechanism for achieving payment function. For example, a slot for receiving coins and a slot for refunding coins are generally used in the conventional coin slot devices. When a user inserts coins into the slot of a conventional coin slot device, a payment value can be automatically generated according to the received coins. Then, some corresponding refunded coins are sent to the user through a refunded slot. Unfortunately, detection failure, wrong detection or error detection of denominations of the received coins may be occurred in the conventional coin slot device. For example, when the conventional coin slot device cannot detect the denominations of the received coins (i.e., detection failure), all received coins would be sent to the user through the refunded slot. The payment value generated by the coin slot device is also reset again, leading to operation inconvenience. Further, only specific types of coins can be received by the conventional coin slot device. For example, some coin slot devices reject to receive a coin with a value of five cents. Further, when the user has no coin (or say, the user only has paper currencies), the user has to exchange the currencies to some specific type of coins for proceeding to operate the conventional coin slot device.

SUMMARY OF THE INVENTION

In an embodiment of the present invention, a cloud coin slot device is disclosed. The cloud coin slot device includes a panel device, a processor, a memory, and a transceiver. The panel device includes a screen, a plurality of seven-segment displays, a plurality of control keys, and an enter key. The screen is used for displaying an identifier image. The plurality of seven-segment displays is used for displaying a payment value. The plurality of control keys is used for inputting the payment value. The enter key is used for confirming the payment value. The processor is coupled to the panel device for processing payment data. The memory is coupled to the processor for saving data of a payment program. The transceiver is coupled to the processor for receiving the payment data transmitted from a server. The transceiver is a wireless-based transceiver or a cable-based transceiver.

In another embodiment of the present invention, a cloud coin slot device is disclosed. The cloud coin slot device includes a panel device, a processor, and a memory. The panel device includes a screen. The screen includes an identifier image, an amount window for displaying a payment value, and a plurality of virtual control keys for inputting the payment value and/or an authentication code. The processor is coupled to the panel device for processing payment data. The memory is coupled to the processor for saving data of a payment program.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
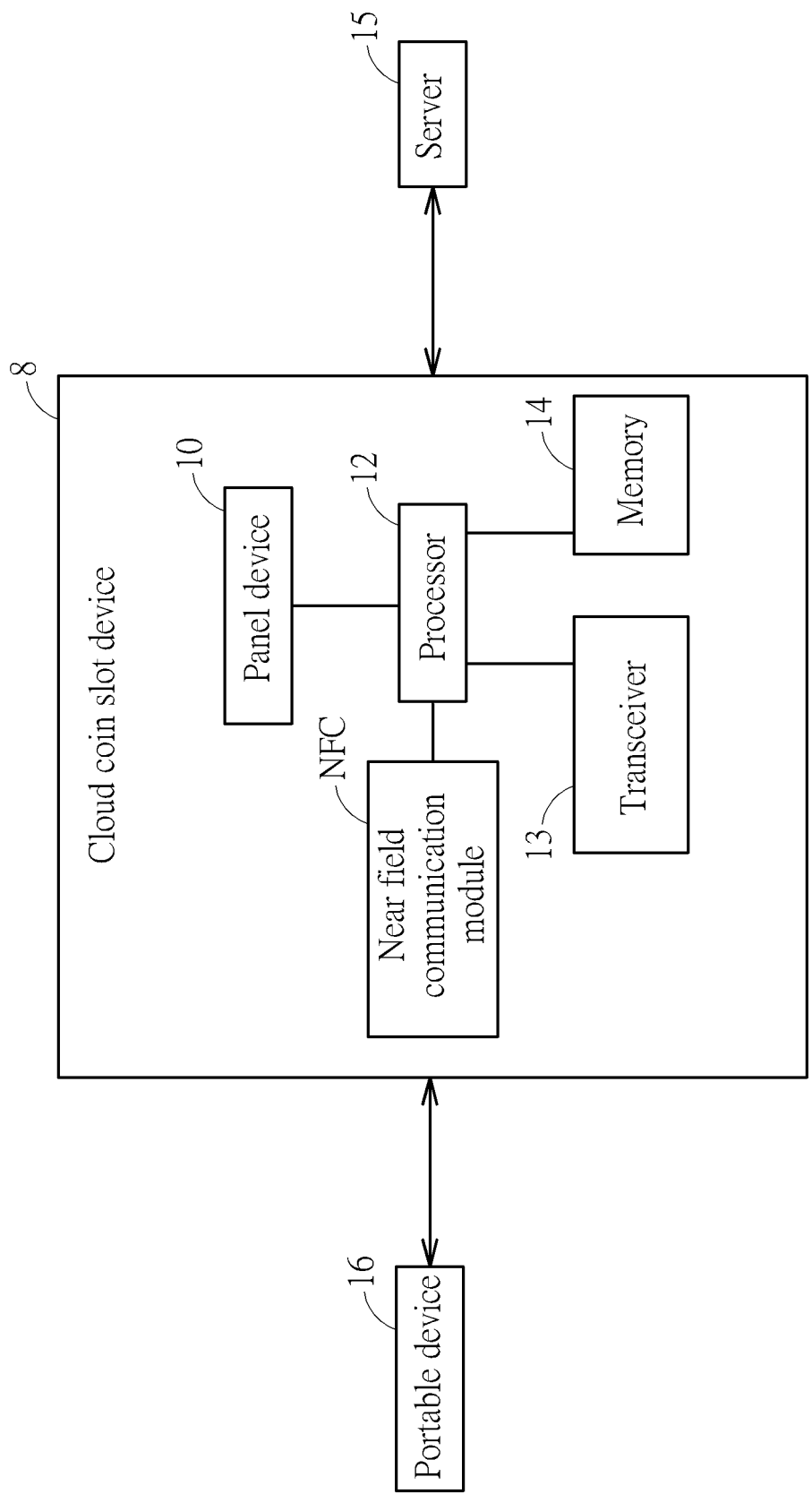
FIG. 1 is a block diagram of a cloud coin slot device of the present invention.

FIG. 1 is a block diagram of a cloud coin slot device 8. The cloud coin slot device 8 includes a panel device 10, a processor 12, a transceiver 13, and a memory 14. Various structures of the panel device 10 are illustrated later. The panel device 10 is used for inputting a payment value. The processor 12 is coupled to the panel device 10 for processing payment data. The memory 14 is coupled to the processor 12 for saving data of a payment application program. The transceiver 13 is coupled to the processor 12 for receiving or transmitting the payment data. The transceiver 13 can be a wireless-based transceiver or a cable-based transceiver. In the cloud coin slot device 8, a method of payment can be selected to an on-line payment mode or an off-line payment mode. For example, an identifier image can be used for identifying payment information between a portable device 16 with an installed payment application program (app) and the panel device 10. Then, when a user selects the on-line payment mode, the portable device 16 and the cloud coin slot device 8 establish connections to a server 15 synchronously for processing the payment data. Thus, a payment process can be completed by using an on-line operation. All detail operational modes with respect to various panel devices 10 are illustrated later. The memory 14 can be used to save data of the payment application program, such as a payment application program of Alipay®. The server 15 can be a cloud server or a work station operated by a third-party payment company. The server 15 can be used for receiving the payment data, confirming the payment data, and terminating the payment process. Particularly, when the user selects the off-line payment mode, an off-line network state is maintained between the cloud coin slot device 8 and the server 15. The cloud coin slot device 8 can use an authentication code for verifying a validity of the payment data. In the following, various on-line and off-line payment modes and the corresponding hardware structures of the panel device 10 are described.

Figure 2:
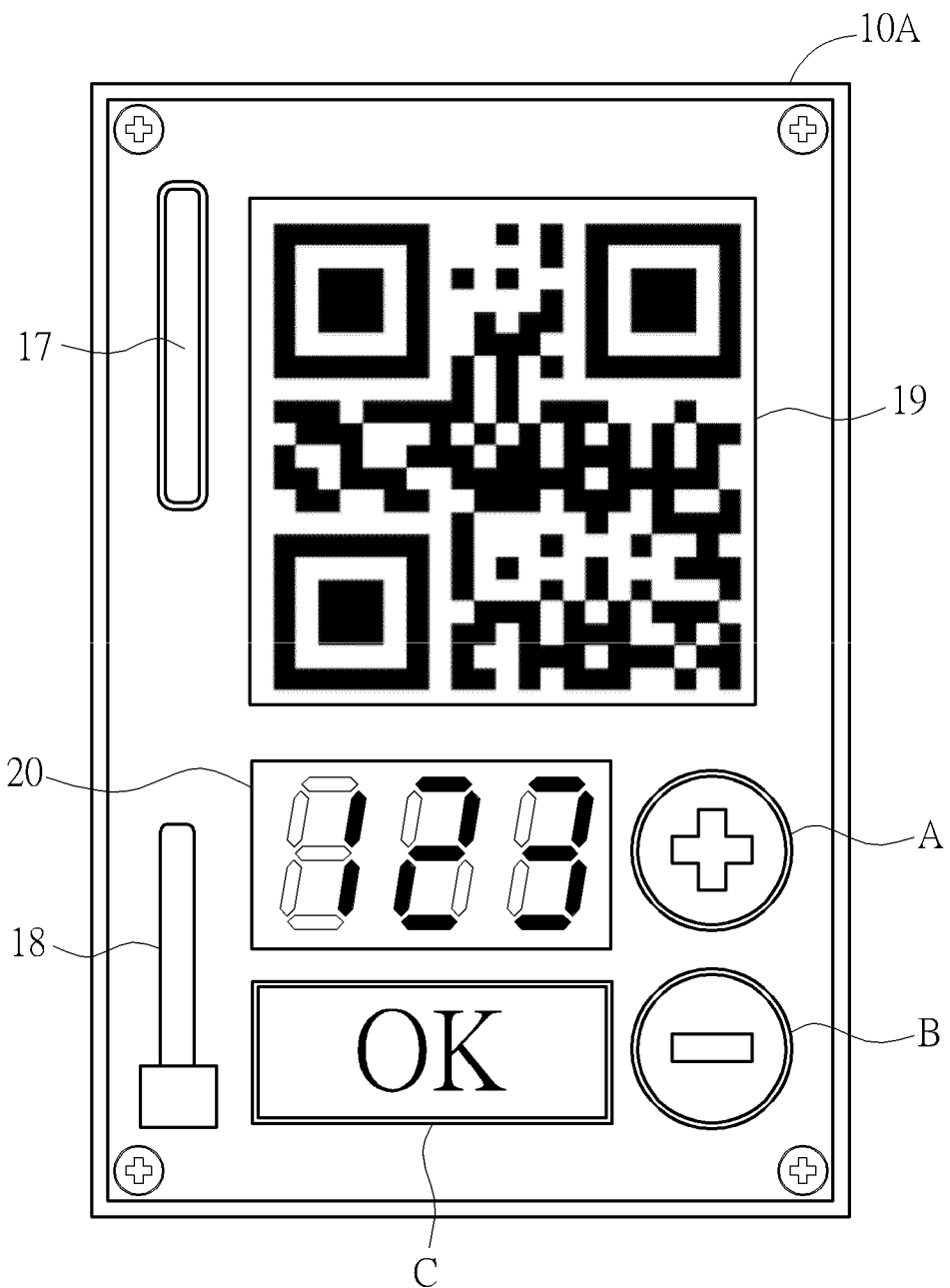
FIG. 2 is a front view of a panel device of the cloud coin slot device in FIG. 1 according to a first embodiment of the present invention.

FIG. 2 is a front view of a panel device 10A of the cloud coin slot device 8. The panel device 10A includes a screen 19, a plurality of seven-segment displays 20, a control key A, a control key B, and an enter key C. The plurality of seven-segment displays 20 is used for displaying a payment value. The control key A and the control key B are used for inputting the payment value. The enter key C is used for confirming the payment value. The operational mode of the cloud coin slot device 8 with the panel device 10A is illustrated below. First, a user uses the control key A and the control key B to select or adjust the payment value. For example, the control key A can be used for increasing the payment value. The control key B can be used for decreasing the payment value. When the user starts to select an appropriate payment value, the seven-segment displays 20 display the corresponding payment value in real-time. For example, three seven-segment displays 20 display the payment value equal to 123. After the displayed payment value is confirmed by the user, the user can press the enter key C. After the enter key C is pressed, a corresponding two-dimensional bar code is generated and displayed on the screen 19. Specifically, the two-dimensional bar code is generated by a processor 12 according to the data of payment application program stored in a memory 14 of the cloud coin slot device 8. Additionally, the screen 19 can be a liquid crystal display or an electronic paper. The processor 12 can generate any typed two-dimensional bar code for displaying on the screen 19. For example, the processor 12 can generate quick response code (QR code) or PDF147 code. After the two-dimensional bar code is displayed on the screen 19, the user can use a scan function of the portable device 16 to identify the two-dimensional bar code. The scan function of the portable device 16 can be compatible with the payment application program (app) installed in the portable device 16. The payment application program can be any payment application program, such as Alipay® app, WeChat® app, or PayPal® app. After the portable device 16 identifies the two-dimensional bar code, a payment process is started by the payment application program of the portable device 16. Then, the portable device 16 establishes a connection to a server 15 (hereafter, say, a cloud server 15). The cloud server 15 can be a server operated by a third-party payment company. The cloud coin slot device 8 also establishes a connection to the cloud server 15. In the following, the user can proceed to operate the payment process according to the instruction of the payment application program. Specifically, since the cloud coin slot device 8, the portable device 16, and the cloud server 15 are connected synchronously, when the user completes the payment process in the portable device 16, the cloud server 15 can receive and confirm the payment data (or payment message) synchronously. For example, the cloud server 15 can synchronize information of a bill of payment and/or a receipt of payment. Then, the cloud coin slot device 8 receives a confirmation message of payment from the cloud server 15 through a transceiver 13 and then completes the payment process of the cloud coin slot device 8. Particularly, the cloud coin slot device 8 can use a wireless-based transceiver or a cable-based transceiver to receive the confirmation message of payment from the cloud server 15. After the payment process of the cloud coin slot device 8 is completed, the cloud coin slot device 8 transmits a message to a dispenser device. Finally, the dispenser device provides a corresponding product or a service to the user. In the embodiment, the panel device 10A further includes a coin slot 17 and a coin refunded device 18. In other words, the cloud coin slot device 8 with the panel device 10A has all functions of the conventional cloud coin slot device. Additionally, the screen 19 of the panel device 10A can be a square shaped screen with a side length equal to 55 mm. The panel device 10A can be a rectangular shaped device with a length equal to 120 mm and a width equal to 80 mm. The enter key C can be disposed on a lower side of the plurality of seven-segment displays 20. The control key A and the control key B are disposed on a right side of the plurality of seven-segment displays 20 and the enter key C. However, sizes of the panel device 10A and the screen 19 are not limited in FIG. 2. Also, positions of the control key A, the control key B, the enter key C, and the plurality of seven-segment displays 20 are not limited in FIG. 2. Since the cloud coin slot device 8 uses a network communication for processing synchronous payment operation, the user can choose the on-line payment mode for increasing operational convenience.

Figure 3:
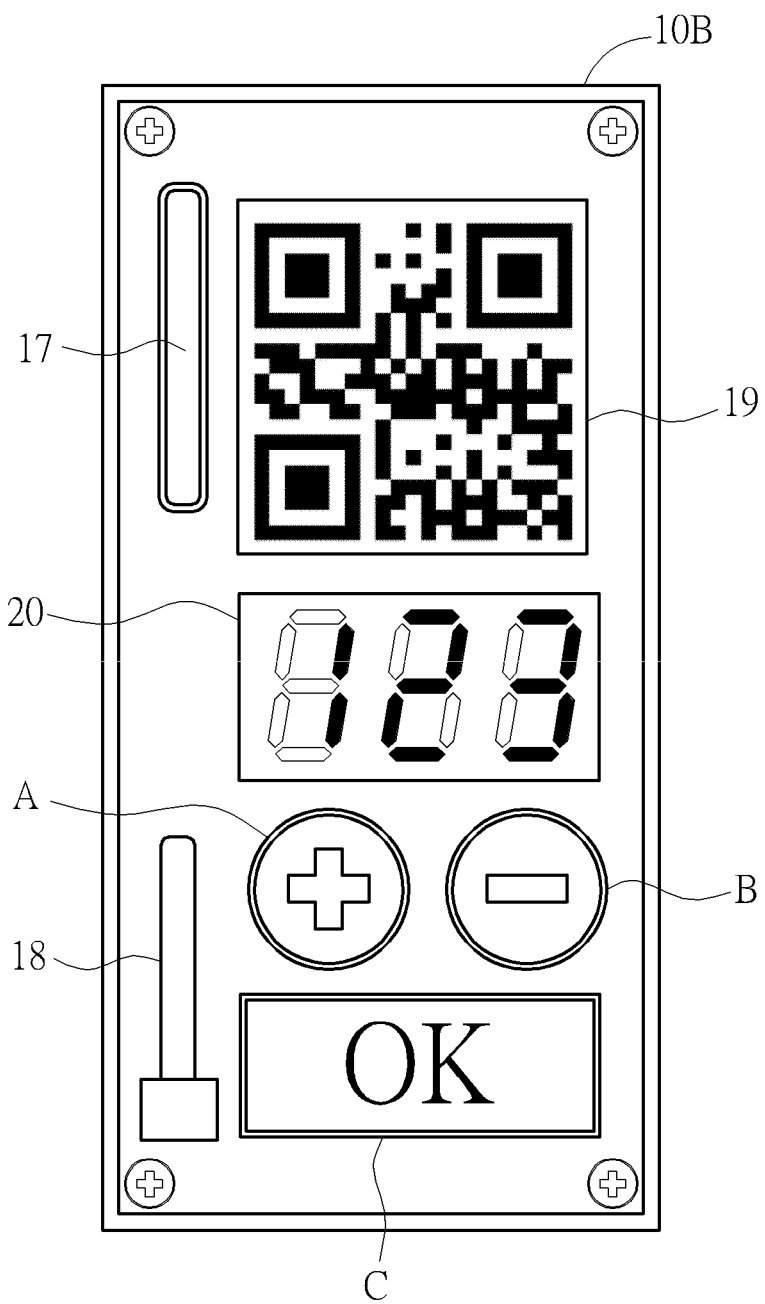
FIG. 3 is a front view of a panel device of the cloud coin slot device in FIG. 1 according to a second embodiment of the present invention.

FIG. 3 is a front view of a panel device 10B of the cloud coin slot device 8. The panel device 10B includes a screen 19, a plurality of seven-segment displays 20, a control key A, a control key B, an enter key C, a coin slot 17, and a coin refunded device 18. The payment process and all functions of the components of the panel device 10B are similar to the panel device 10A and thus omitted here. Specifically, positions of the control key A, the control key B, and the enter key C of the panel device 10B are different from key positions of the panel device 10A. In the panel device 10B, the control key A and the control key B are disposed between the plurality of seven-segment displays 20 and the enter key C. Thus, the panel device 10B can be implemented with a smaller panel region than the panel device 10A. For example, the screen 19 of the panel device 10B can be a square shaped panel with a side length equal to 45 mm. The panel device 10B can be a rectangular shaped panel with a length equal to 120 mm and a width equal to 60 mm.

Figure 4:
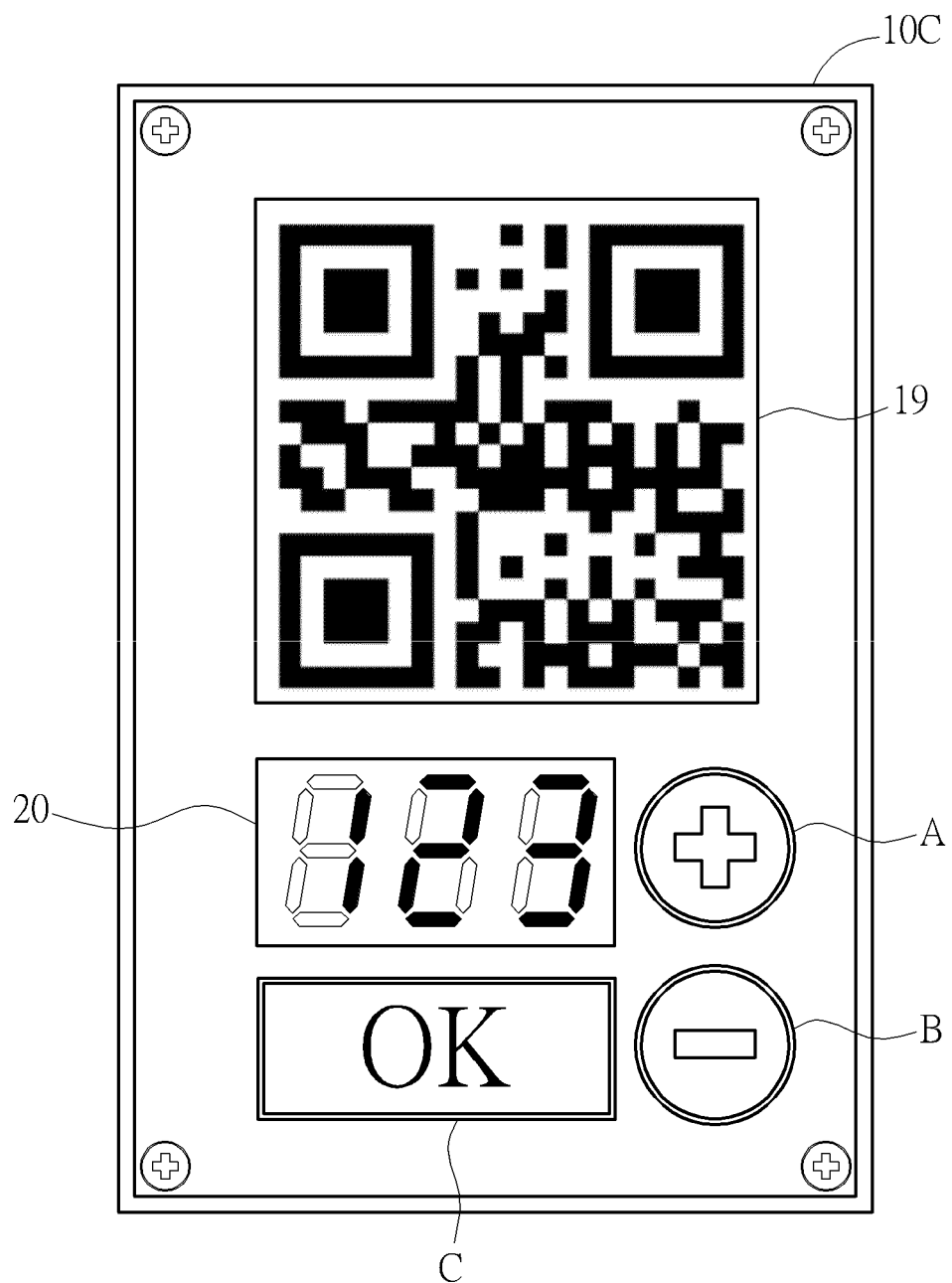
FIG. 4 is a front view of a panel device of the cloud coin slot device in FIG. 1 according to a third embodiment of the present invention.

FIG. 4 is a front view of a panel device 10C of the cloud coin slot device 8. The panel device 10C includes a screen 19, a plurality of seven-segment displays 20, a control key A, a control key B, and an enter key C. The payment process and all functions of the components of the panel device 10C are similar to the panel device 10A and thus omitted here. Specifically, the panel device 10C lacks a coin slot 17 and a coin refunded device 18 of the panel device 10A. Thus, the panel device 10C is incompatible with a conventional coin-inserted based coin slot device. In other words, although the panel device 10C can be implemented with a smaller panel region than the panel device 10A, it lacks of supporting a payment method of conventional coin-inserted based coin slot device.

Figure 5:
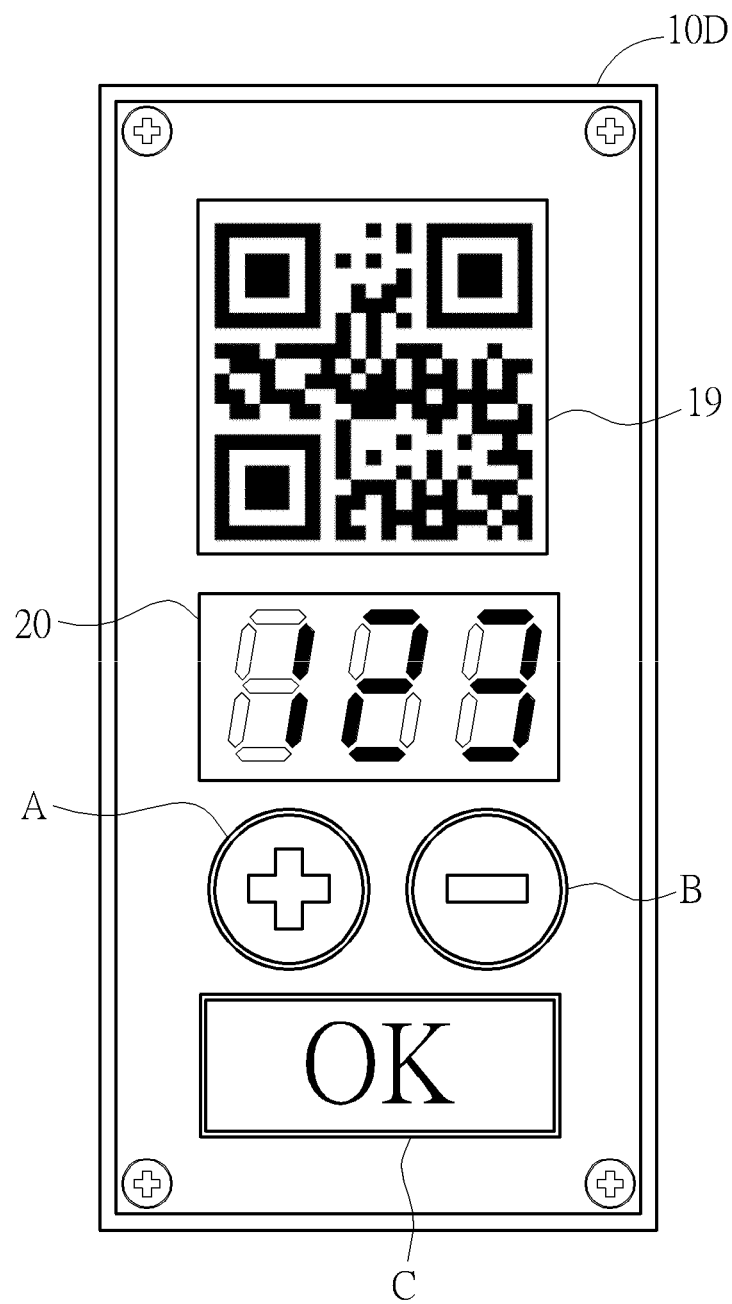
FIG. 5 is a front view of a panel device of the cloud coin slot device in FIG. 1 according to a fourth embodiment of the present invention.

FIG. 5 is a front view of a panel device 10D of the cloud coin slot device 8. The panel device 10D includes a screen 19, a plurality of seven-segment displays 20, a control key A, a control key B, and an enter key C. The payment process and all functions of the components of the panel device 10D are similar to the panel device 10B and thus omitted here. Specifically, the panel device 10D lacks a coin slot 17 and a coin refunded device 18 of the panel device 10B. Thus, the panel device 10D is incompatible with a conventional coin-inserted based coin slot device. In other words, although the panel device 10D can be implemented with a smaller panel region than the panel device 10B, it lacks of supporting a payment method of conventional coin-inserted based coin slot device.

The aforementioned panel device 10A to the panel device 10D of the cloud coin slot device 8 are regarded as panel devices with half display screen for supporting to perform on-line payment mode. Specifically, the cloud coin slot device 8 can also perform a function of near field communication. For example, in FIG. 1, the cloud coin slot device 8 can further include a near field communication module NFC. The near field communication module NFC is coupled to the processor 12 for sensing a portable device 16 with a capability of near field communication. Thus, the cloud coin slot device 8 can establish a connection to the portable device 16 through a near field communication network. By doing so, the cloud coin slot device 8 can perform near field communication-based payment mechanism. The near field communication-based payment mechanism and corresponding panel devices are illustrated below.

Figure 6:
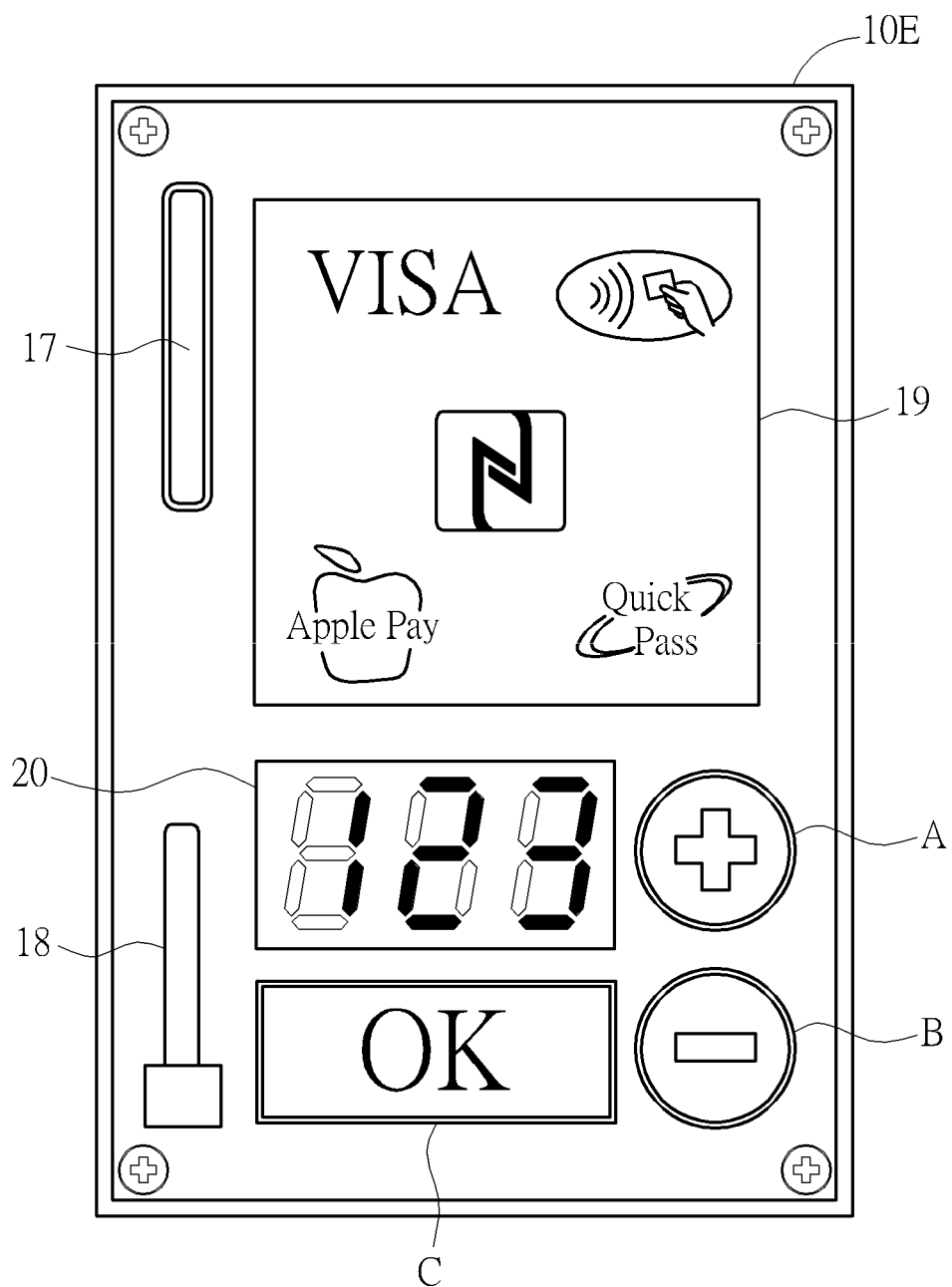
FIG. 6 is a front view of a panel device of the cloud coin slot device in FIG. 1 according to a fifth embodiment of the present invention.

FIG. 6 is a front view of a panel device 10E of the cloud coin slot device 8. The panel device 10E includes a screen 19, a plurality of seven-segment displays 20, a control key A, a control key B, an enter key C, a coin slot 17, and a coin refunded device 18. The plurality of seven-segment displays 20 is used for displaying a payment value. The control key A and the control key B are used for inputting the payment value. The enter key C is used for confirming the payment value. The operation mode of the cloud coin slot device 8 with the panel device 10E is illustrated below. First, a user uses the control key A and the control key B to select or adjust the payment value. When the user starts to select an appropriate payment value, the seven-segment displays 20 display the corresponding payment value in real-time. At the moment, the screen 19 displays various payment company marks which support a service of near field communication-based payment. For example, the screen 19 displays Quick Pass® and Apple Pay® marks. Next, the portable device 16 with a capability of near field communication is approached to the panel device 10E by the user. Then, the near field communication module NFC of the panel device 10E can receive payment data or payment configurations from the portable device 16. After the near field communication module NFC detects the portable device 16, the panel device 10E establishes a connection to the portable device 16 and starts a payment process. Then, the portable device 16 and the cloud coin slot device 8 establish connections to a cloud server 15 (i.e., a server operated by third-party payment company). In the following, the user can proceed to operate the payment process according to the instruction of a payment application program installed in the portable device 16. Specifically, since the cloud coin slot device 8, the portable device 16, and the cloud server 15 are connected synchronously, when the user completes a payment process in the portable device 16, the cloud server 15 can receive and confirm the payment data (or payment message) synchronously. For example, the cloud server 15 can synchronize information of a bill of payment and/or a receipt of payment. Then, the cloud coin slot device 8 receives a confirmation message of payment from the cloud server 15 through a transceiver 13 and then completes the payment process of the cloud coin slot device 8. Particularly, the cloud coin slot device 8 can use wireless-based transceiver or cable-based transceiver to receive the confirmation message of payment from the cloud server 15. After the payment process of the cloud coin slot device 8 is completed, the cloud coin slot device 8 transmits a message to a dispenser device. Finally, the dispenser device provides a corresponding product or a service to the user. In the embodiment, the panel device 10E has the coin slot 17 and the coin refunded device 18. In other words, the cloud coin slot device 8 with the panel device 10E has all functions of the conventional cloud coin slot device. Additionally, sizes and shapes of the panel device 10E and the panel device 10A can be identical. However, the size and the shape of the panel device 10E can also be arbitrary. Further, positions of the control key A, the control key B, and the plurality of seven-segment displays 20 are not limited in FIG. 6. Additionally, the payment process of the panel device 10E is not limited to aforementioned payment process. For example, the user can ignore a step of setting a value of payment. In other words, the user can directly enable a near field communication function of the portable device 16. The panel device 10E can receive a predefined payment scheme from the portable device 16 automatically. After establishing a connection between the portable device 16 and the cloud coin slot device 8, the user can proceed to operate the payment process according to the instruction of a payment application program installed in the portable device 16. Then, the cloud coin slot device 8 receives a confirmation message of payment from the cloud server 15 through a transceiver 13 and then completes the payment process of the cloud coin slot device 8. By doing so, since the cloud coin slot device 8 uses a network communication in conjunction with the near field communication for processing synchronous payment operation, the user can choose the on-line payment mode for increasing operational convenience.

Figure 7:
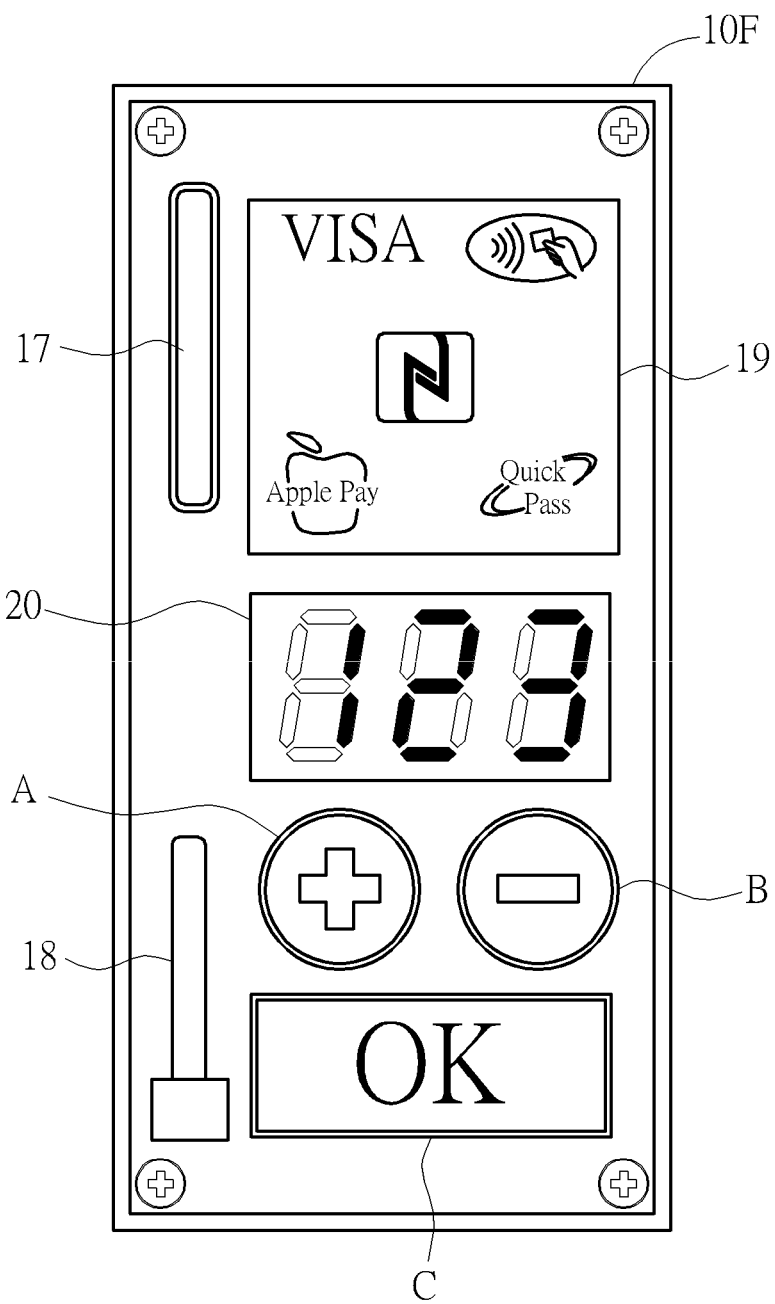
FIG. 7 is a front view of a panel device of the cloud coin slot device in FIG. 1 according to a sixth embodiment of the present invention.

FIG. 7 is a front view of a panel device 10F of the cloud coin slot device 8. The panel device 10F includes a screen 19, a plurality of seven-segment displays 20, a control key A, a control key B, an enter key C, a coin slot 17, and a coin refunded device 18. The payment process and all functions of the components of the panel device 10F are similar to the panel device 10E and thus omitted here. Specifically, positions of the control key A, the control key B, and the enter key C of the panel device 10F are different from key positions of the panel device 10E. In the panel device 10F, the control key A and the control key B are disposed between the plurality of seven-segment displays 20 and the enter key C. Thus, the panel device 10F can be implemented with a smaller panel region than the panel device 10E. For example, the screen 19 of the panel device 10F can be a square shaped panel with a side length equal to 45 mm. The panel device 10F can be a rectangular shaped panel with a length equal to 120 mm and a width equal to 60 mm.

Figure 8:
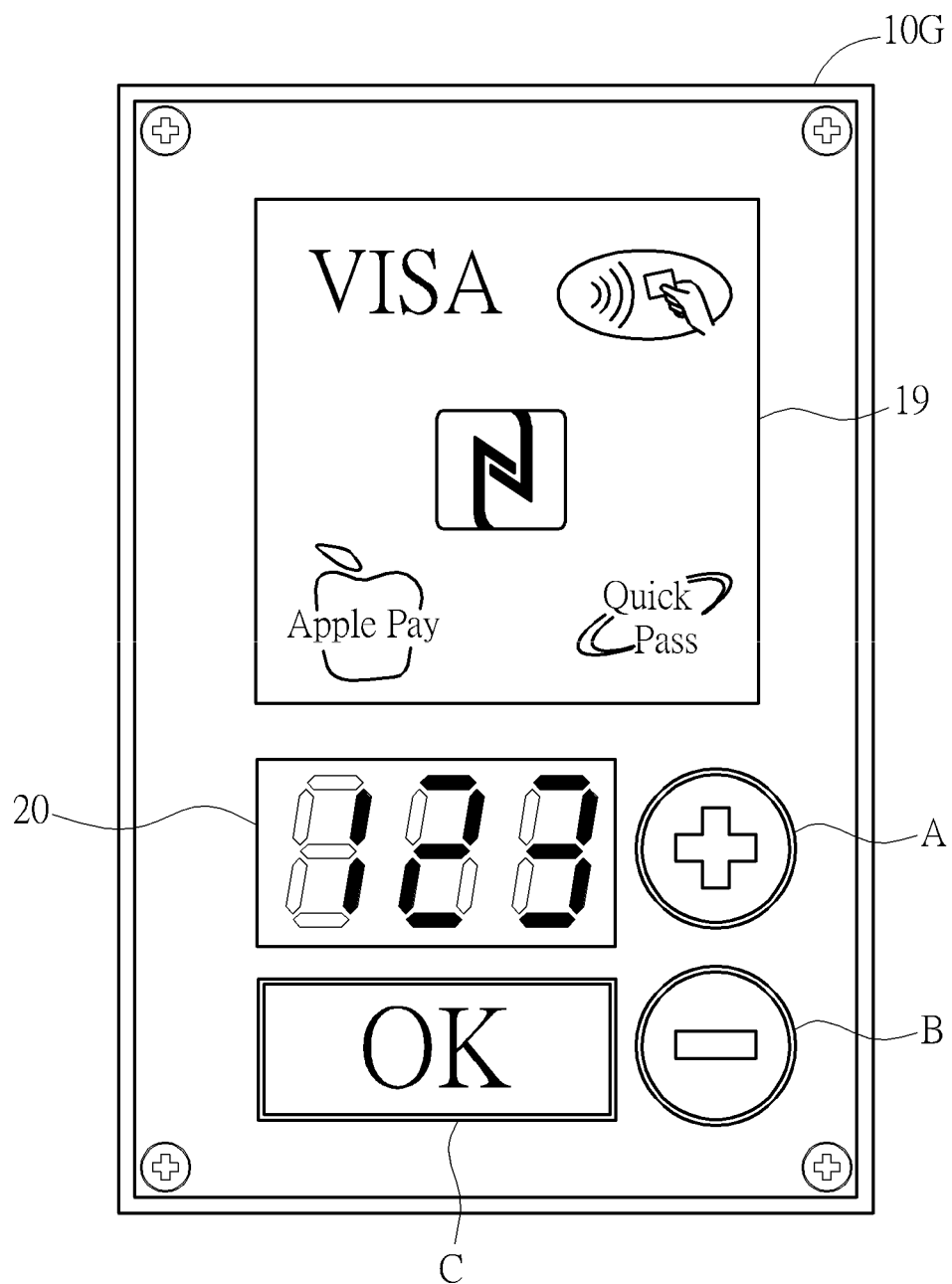
FIG. 8 is a front view of a panel device of the cloud coin slot device in FIG. 1 according to a seventh embodiment of the present invention.

FIG. 8 is a front view of a panel device 10G of the cloud coin slot device 8. The panel device 10G includes a screen 19, a plurality of seven-segment displays 20, a control key A, a control key B, and an enter key C. The payment process and all functions of the components of the panel device 10G are similar to the panel device 10E and thus omitted here. Specifically, the panel device 10G lacks a coin slot 17 and a coin refunded device 18 of the panel device 10E. Thus, the panel device 10G is incompatible of conventional coin-inserted based coin slot device. In other words, although the panel device 10G can be implemented with a smaller panel region than the panel device 10E, it lacks of supporting a payment method of conventional coin-inserted based coin slot device.

Figure 9:
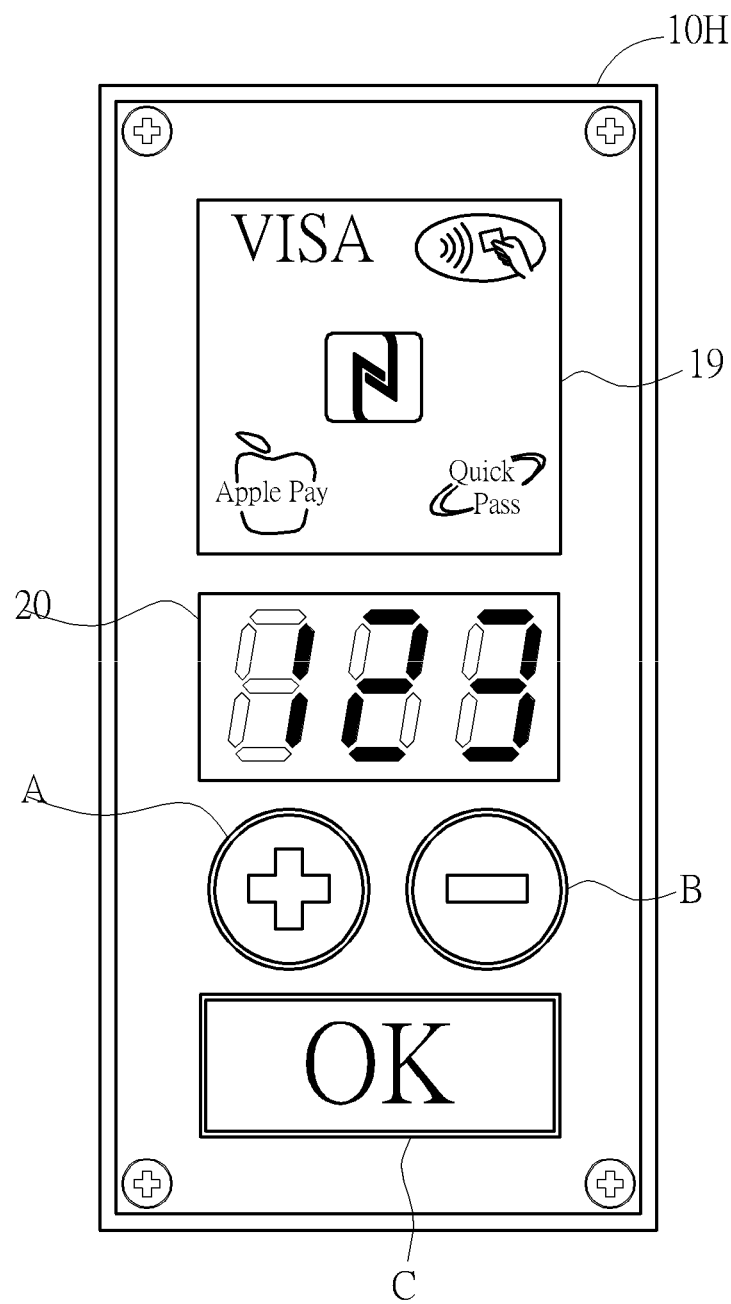
FIG. 9 is a front view of a panel device of the cloud coin slot device in FIG. 1 according to an eight embodiment of the present invention.

FIG. 9 is a front view of a panel device 10H of the cloud coin slot device 8. The panel device 10H includes a screen 19, a plurality of seven-segment displays 20, a control key A, a control key B, and an enter key C. The payment process and all functions of the components of the panel device 10H are similar to the panel device 10F and thus omitted here. Specifically, the panel device 10H lacks a coin slot 17 and a coin refunded device 18 of the panel device 10F. Thus, the panel device 10H is incompatible with a conventional coin-inserted based coin slot device. In other words, although the panel device 10H can be implemented with a smaller panel region than the panel device 10F, it lacks of supporting a payment method of conventional coin-inserted based coin slot device.

The aforementioned panel devices 10E to 10H of the cloud coin slot device 8 are regarded as panel devices with half display screen for supporting to on-line payment mode in conjunction with near field communication. Specifically, the cloud coin slot device 8 can also perform an off-line payment mode. In other words, a user can choose the off-line payment mode for dealing with transactions. The off-line payment mechanism and corresponding panel devices are illustrated below.

Figure 10:
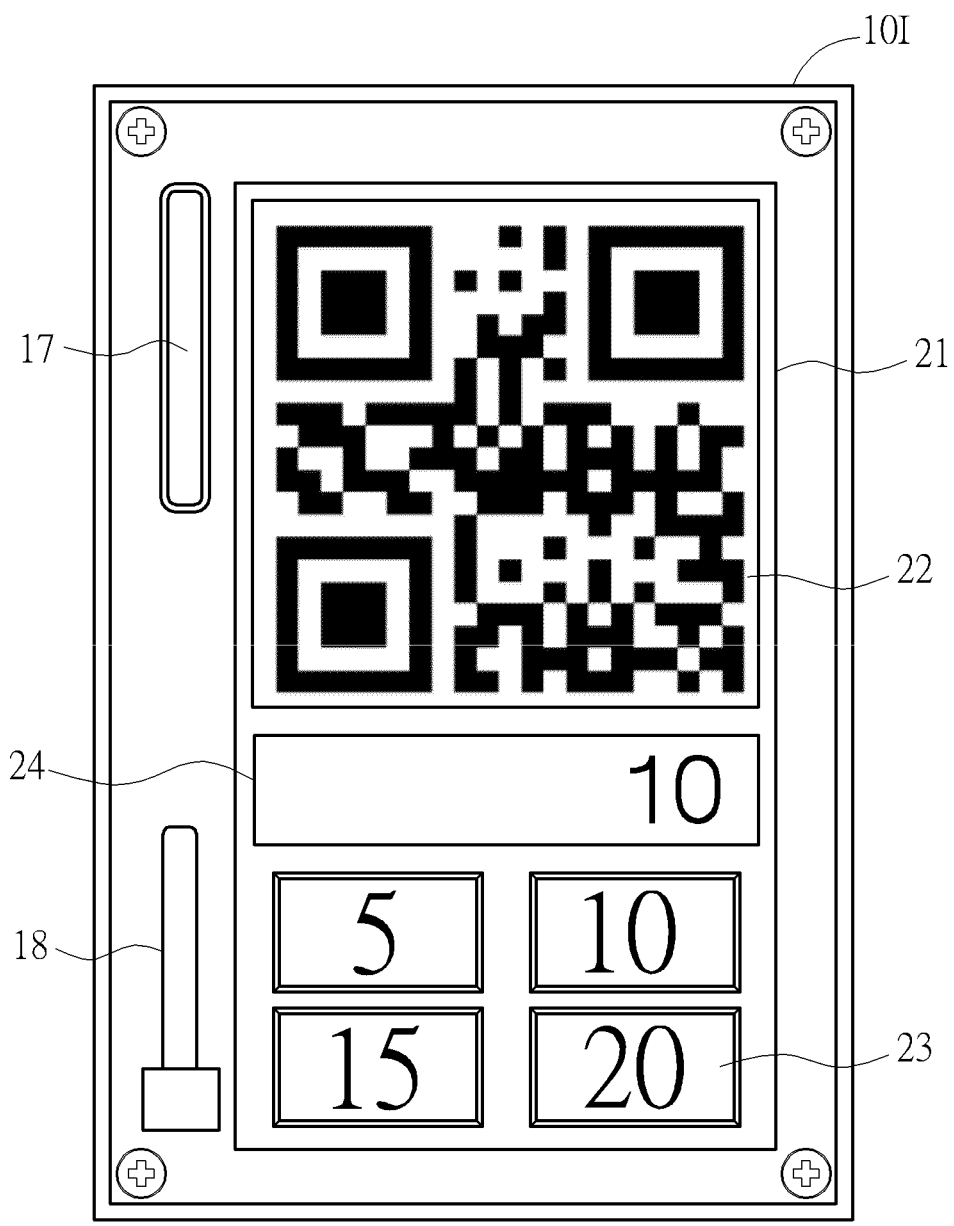
FIG. 10 is a front view of a panel device of the cloud coin slot device in FIG. 1 according to a ninth embodiment of the present invention.

FIG. 10 is a front view of a panel device 10I of the cloud coin slot device 8. The panel device 10I includes a screen 21. The screen 21 includes an identifier image (two-dimensional bar code) 22, an amount window 24, and a plurality of virtual control keys 23. The amount window 24 is used for displaying a payment value. The plurality of virtual control keys 23 is used for inputting the payment value and/or an authentication code. In the panel device 10I, an off-line payment mode is introduced, as illustrated below. First, a user uses the plurality of virtual control keys 23 to select the payment value. For example, the user can press a virtual control key 23 indicating 10 dollars. When the user starts to select an appropriate payment value, the amount window 24 displays the corresponding payment value in real-time. For example, the amount window 24 can display the payment value equal to 10. After the user completes selecting the appropriate payment value, a two-dimensional bar code 22 is generated by a processor 12 according to the data of payment application program stored in a memory 14 of the cloud coin slot device 8. The two-dimensional bar code 22 is further displayed on the screen 21. Additionally, the screen 21 can be a touch screen. The processor 12 can generate any typed two-dimensional bar code 22 for displaying on the screen 21. For example, the processor 12 can generate a quick response code (QR code) or PDF147 code. After the two-dimensional bar code 22 is displayed on the screen 21, the user can use a scan function of the portable device 16 to identify the two-dimensional bar code 22. The scan function of the portable device 16 can be compatible with the payment application program installed in the portable device 16. The payment application program can be any payment application program, such as Alipay® app, WeChat® app, or PayPal® app. After the portable device 16 identifies the two-dimensional bar code 22, a payment process is started by the payment application program of the portable device 16. The user can proceed to operate the payment process according to the instruction of the payment application program. Specifically, the portable device 16 and a cloud server 15 are connected synchronously. Thus, after the payment process of the portable device 16 is completed according to the payment application program, the cloud server 15 generates an authentication code with six numbers. Then, the authentication code is transmitted to the portable device 16. Thus, the portable device 16 can display the authentication code. Specifically, the authentication code is not limited to six numbers. For example, the authentication code can be an alphanumeric code with arbitrary length. In the following, the user has to input the authentication code to the screen 21 for completing the payment process. For example, after the screen 21 generates the two-dimensional bar code 22, the portable device 16 can identify the two-dimensional bar code 22. Then, the screen 21 can generate an interface for inputting the authentication code. The user uses the interface to input the authentication code corresponding to the value of payment. Particularly, the interface for inputting the authentication code can include virtual number keys and an enter key. The user can use the virtual number keys to input the authentication code and then confirm the authentication code by using the enter key. Finally, the authentication code can be received by the screen 21. After the cloud coin slot device 8 successfully verifies the authentication code, the cloud coin slot device 8 transmits a message to a dispenser device. The dispenser device provides a corresponding product or a service to the user. In the embodiment, the panel device 10I further includes a coin slot 17 and a coin refunded device 18. In other words, the cloud coin slot device 8 with the panel device 10I has all functions of the conventional cloud coin slot device. Briefly, the off-line payment mode of the cloud coin slot device 8 with the panel device 10I is performed by using verification of the authentication code generated by the payment application program installed in the portable device 16. Additionally, the screen 21 of the panel device 10I can be a rectangular shaped screen with a length equal to 105 mm and a width equal to 55 mm. The plurality of virtual control keys 23 is disposed on a lower side of the amount window 24. However, sizes of the panel device 10I and the screen 21 are not limited in FIG. 10. Also, positions of the plurality of virtual control keys 23, the amount window 24, and the two-dimensional bar code 22 are not limited in FIG. 10. Since the cloud coin slot device 8 can use the two-dimensional bar code 22 and the authentication code for providing an off-line payment mode, the user can choose the off-line payment mode for increasing operation convenience.

Figure 11:
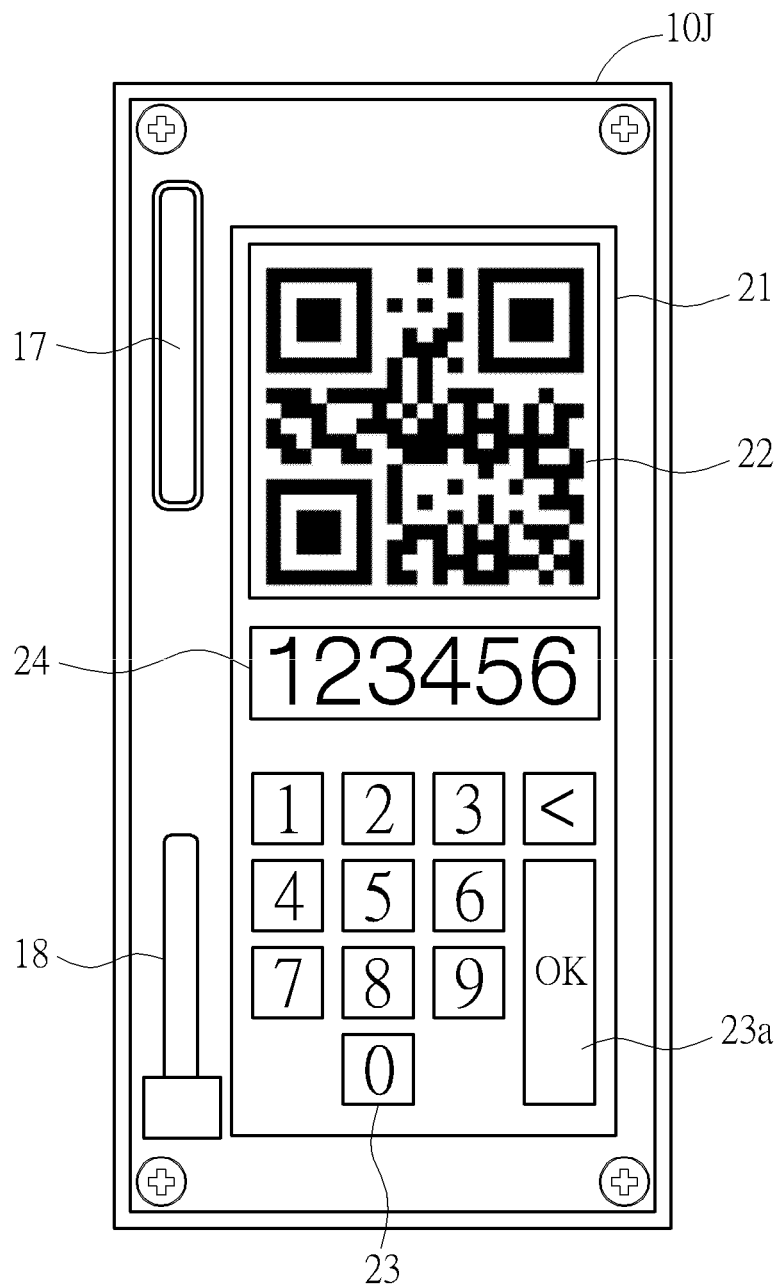
FIG. 11 is a front view of a panel device of the cloud coin slot device in FIG. 1 according to a tenth embodiment of the present invention.

FIG. 11 is a front view of a panel device 10J of the cloud coin slot device 8. The panel device 10J includes a screen 21. The screen 21 includes an identifier image (two-dimensional bar code) 22, an amount window 24, a plurality of virtual control keys 23, a virtual enter key 23a, coin slot 17, and a coin refunded device 18. The payment process and all functions of the components of the panel device 10J are similar to the panel device 10I and thus omitted here. Specifically, the virtual enter key 23a is introduced to the panel device 10J. After a user uses the plurality of virtual control keys 23 to choose an appropriate payment value, the amount window 24 displays the payment value. Then, the user can use the virtual enter key 23a to confirm the payment value. A two-dimensional bar code 22 is further generated by a processor 12 according to the data of payment application program stored in a memory 14 of the cloud coin slot device 8. The subsequent steps of the off-line payment mode are similar to the off-line payment mode of the panel device 10I. In the panel device 10J, the plurality of virtual control keys 23 and the virtual enter key 23a are disposed on a lower side of the amount window 24. However, positions of the plurality of virtual control keys 23, the virtual enter key 23a, and the amount window 24 are not limited in FIG. 11. Further, the screen 21 of the panel device 10J can be a rectangular shaped device with a length equal to 100 mm and a width equal to 45 mm.

Figure 12:
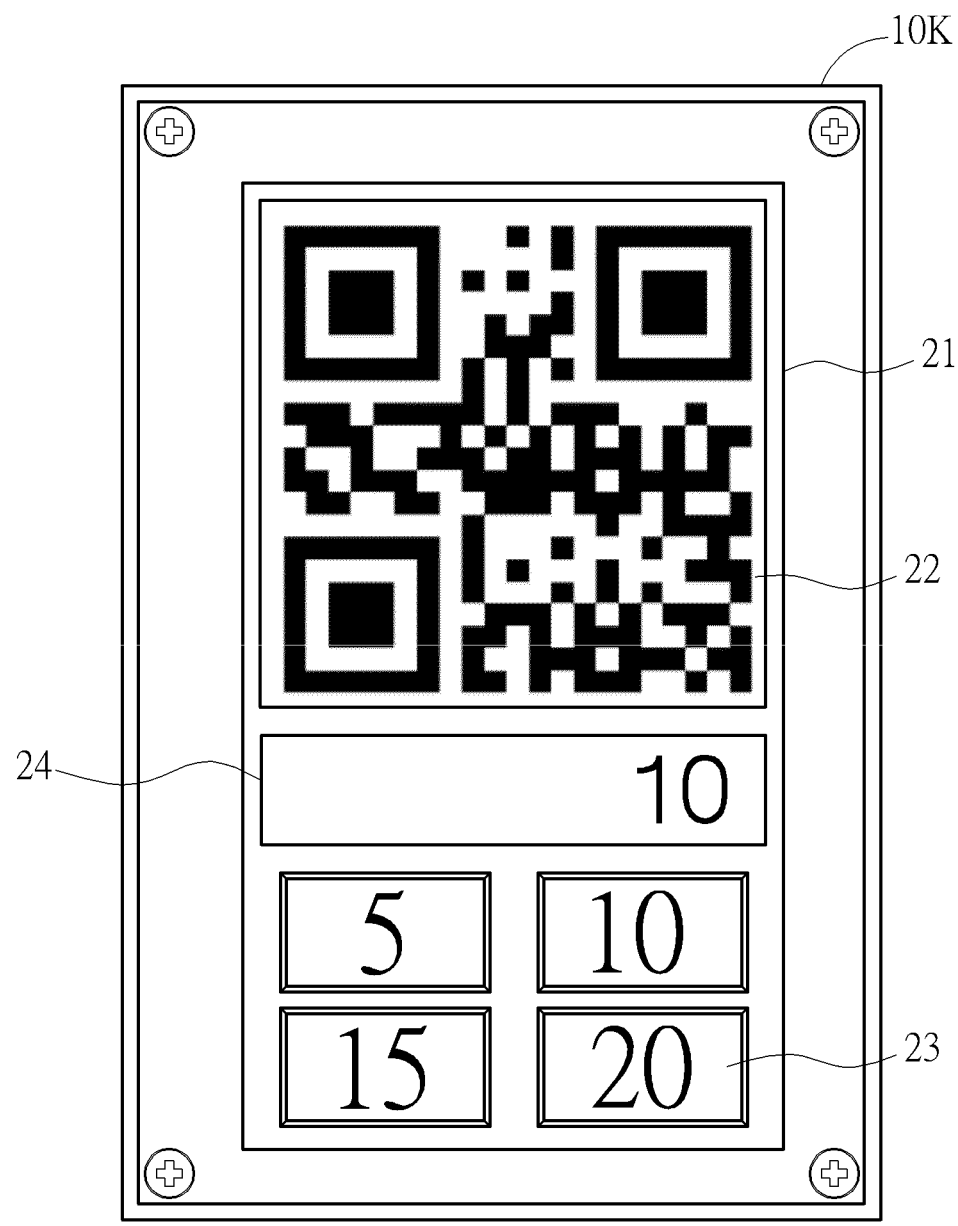
FIG. 12 is a front view of a panel device of the cloud coin slot device in FIG. 1 according to an eleventh embodiment of the present invention.

FIG. 12 is a front view of a panel device 10K of the cloud coin slot device 8. The panel device 10K includes a screen 21. The screen 21 includes an identifier image (two-dimensional bar code) 22, an amount window 24, and a plurality of virtual control keys 23. The payment process and all functions of the components of the panel device 10K are similar to the panel device 10I and thus omitted here. Specifically, the panel device 10K lacks a coin slot 17 and a coin refunded device 18 of the panel device 10I. Thus, the panel device 10K is incompatible with a conventional coin-inserted based coin slot device. In other words, although the panel device 10K can be implemented with a smaller panel region than the panel device 10I, it lacks of supporting a payment method of conventional coin-inserted based coin slot device.

Figure 13:
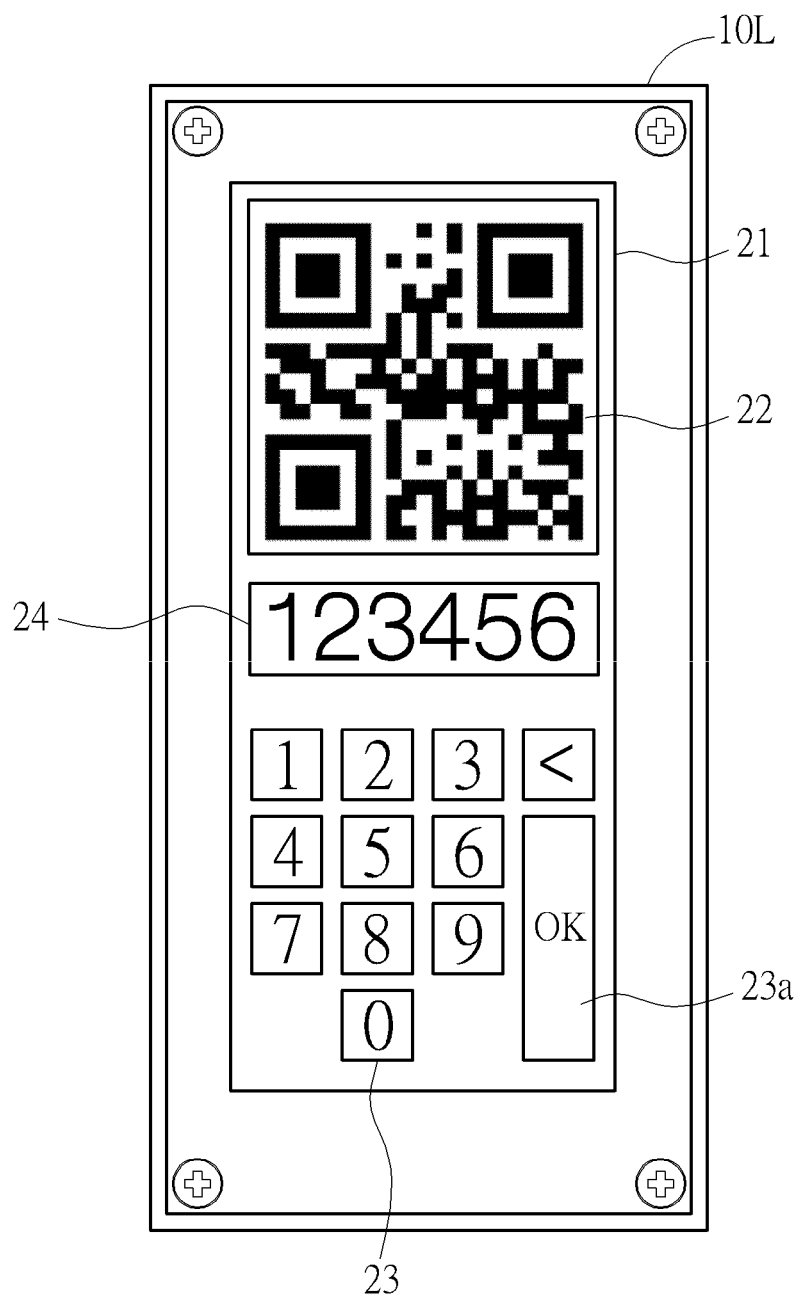
FIG. 13 is a front view of a panel device of the cloud coin slot device in FIG. 1 according to a twelfth embodiment of the present invention.

FIG. 13 is a front view of a panel device 10L of the cloud coin slot device 8. The panel device 10L includes a screen 21. The screen 21 includes an identifier image (two-dimensional bar code) 22, an amount window 24, a plurality of virtual control keys 23, and a virtual enter key 23a. The payment process and all functions of the components of the panel device 10L are similar to the panel device 10J and thus omitted here. Specifically, the panel device 10L lacks a coin slot 17 and a coin refunded device 18 of the panel device 10J. Thus, the panel device 10L is incompatible with a conventional coin-inserted based coin slot device. In other words, although the panel device 10L can be implemented with a smaller panel region than the panel device 10J, it lacks of supporting a payment method of conventional coin-inserted based coin slot device.

The aforementioned panel device 10I to the panel device 10L of the cloud coin slot device 8 are regarded as panel devices with full display screen for supporting performance of the off-line payment mode. Specifically, the cloud coin slot device 8 capable of off-line payment mode can also perform a function of near field communication. For example, in FIG. 1, the cloud coin slot device 8 can further include a near field communication module NFC. The near field communication module NFC is coupled to the processor 12 for sensing a portable device 16 with a capability of near field communication. Thus, the cloud coin slot device 8 can establish a connection to the portable device 16 through a near field communication network. By doing so, the cloud coin slot device 8 can perform a near field communication-based payment mechanism. In the following, the near field communication-based payment mechanism and the corresponding panel devices are illustrated.

Figure 14:
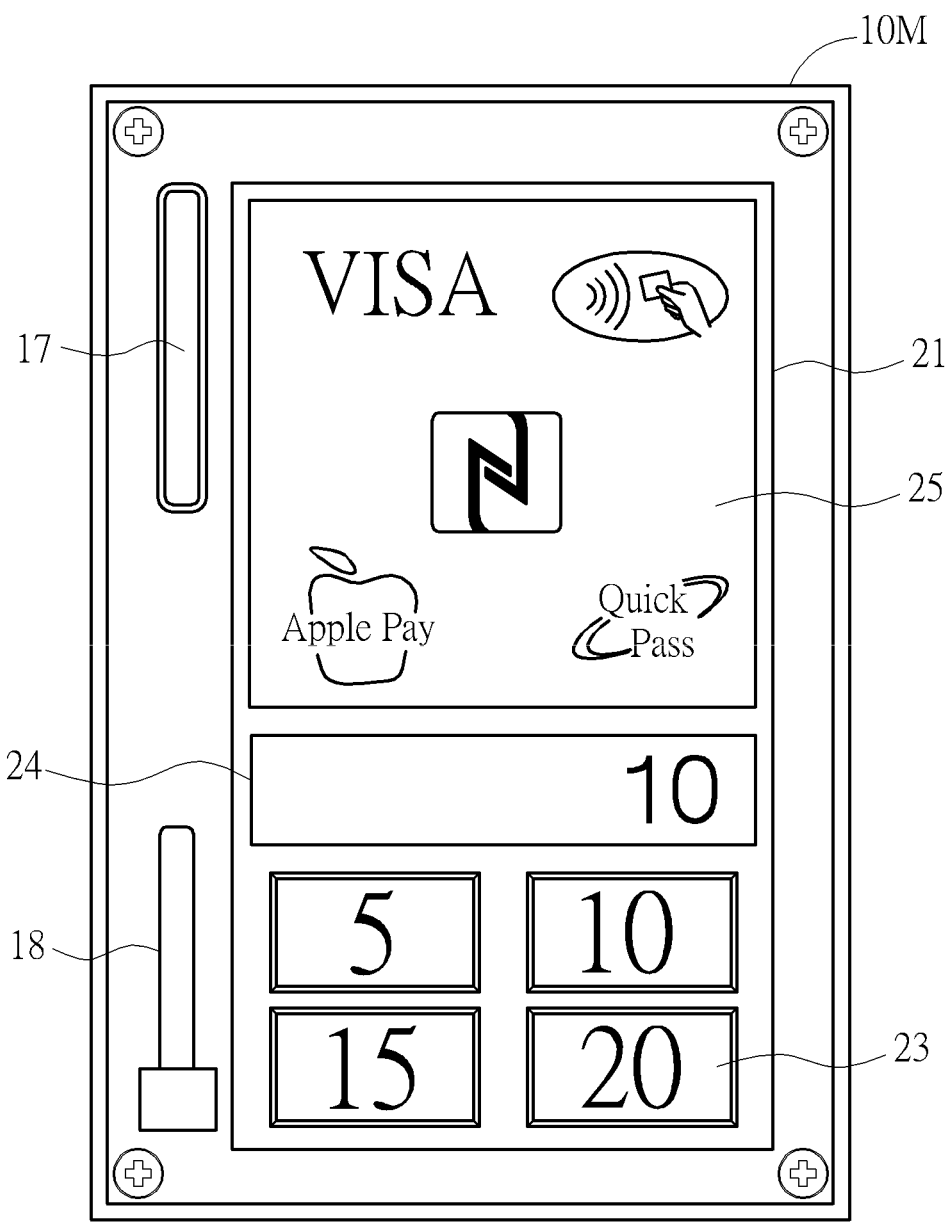
FIG. 14 is a front view of a panel device of the cloud coin slot device in FIG. 1 according to a thirteenth embodiment of the present invention.

FIG. 14 is a front view of a panel device 10M of the cloud coin slot device 8. The panel device 10M includes a screen 21. The screen 21 includes an identifier image (various payment company marks) 25, an amount window 24, and a plurality of virtual control keys 23. The amount window 24 is used for displaying a payment value. The plurality of virtual control keys 23 is used for inputting the payment value. The payment mode of the panel device 10M of the cloud coin slot device 8 is illustrated below. First, a user uses the plurality of virtual control keys 23 to select the payment value. When the user starts to select an appropriate payment value, the amount window 24 displays the corresponding payment value in real-time. At the moment, the screen 21 displays various payment company marks 25 which support a service of near field communication-based payment. For example, the screen 21 displays Quick Pass® and Apple Pay® marks. Next, the portable device 16 with a capability of near field communication is approached to the panel device 10M by the user. Then, the near field communication module NFC of the panel device 10M can receive payment data or payment configurations from the portable device 16. After the near field communication module NFC detects the portable device 16, the panel device 10M establishes a connection to the portable device 16 and starts a payment process. Then, the portable device 16 and the cloud coin slot device 8 establish connections to a cloud server 15 (i.e., a server operated by third-party payment company). In the following, the user can proceed to operate the payment process according to the instruction of a payment application program installed in the portable device 16. Specifically, since the cloud coin slot device 8, the portable device 16, and the cloud server 15 are connected synchronously, when the user completes a payment process in the portable device 16, the cloud server 15 can receive and confirm the payment data (or payment message) synchronously. For example, the cloud server 15 can synchronize information of a bill of payment and/or a receipt of payment. Then, the cloud coin slot device 8 receives a confirmation message of payment from the cloud server 15 through a transceiver 13 and then completes the payment process of the cloud coin slot device 8. Particularly, the cloud coin slot device 8 can use a wireless-based transceiver or a cable-based transceiver to receive the confirmation message of payment from the cloud server 15. After the payment process of the cloud coin slot device 8 is completed, the cloud coin slot device 8 transmits a message to a dispenser device. Finally, the dispenser device provides a corresponding product or service to the user. In the embodiment, the panel device 10M has a coin slot 17 and a coin refunded device 18. In other words, the cloud coin slot device 8 with the panel device 10M has all functions of the conventional cloud coin slot device. Additionally, sizes and shapes of the panel device 10M and the panel device 10I can be identical. However, the size and shape of the panel device 10M can also be arbitrary. Further, positions of the identifier image (various payment company marks) 25, the amount window 24, and the plurality of virtual control keys 23 are not limited in FIG. 14. Additionally, the payment process of the panel device 10M is not limited to aforementioned payment process. For example, the user can ignore a step of setting a value of payment. In other words, the user can directly enable a near field communication function of the portable device 16. The panel device 10M can receive a predefined payment scheme from the portable device 16 automatically. After establishing a connection between the portable device 16 and the cloud coin slot device 8, the user can proceed to operate the payment process according to the instruction of a payment application program installed in the portable device 16. Then, the cloud coin slot device 8 receives a confirmation message of payment from the cloud server 15 through a transceiver 13 and then completes the payment process of the cloud coin slot device 8. By doing so, since the cloud coin slot device 8 uses a network communication in conjunction with the near field communication for processing synchronous payment operation, the user can also choose the on-line payment mode for increasing operation convenience.

Figure 15:
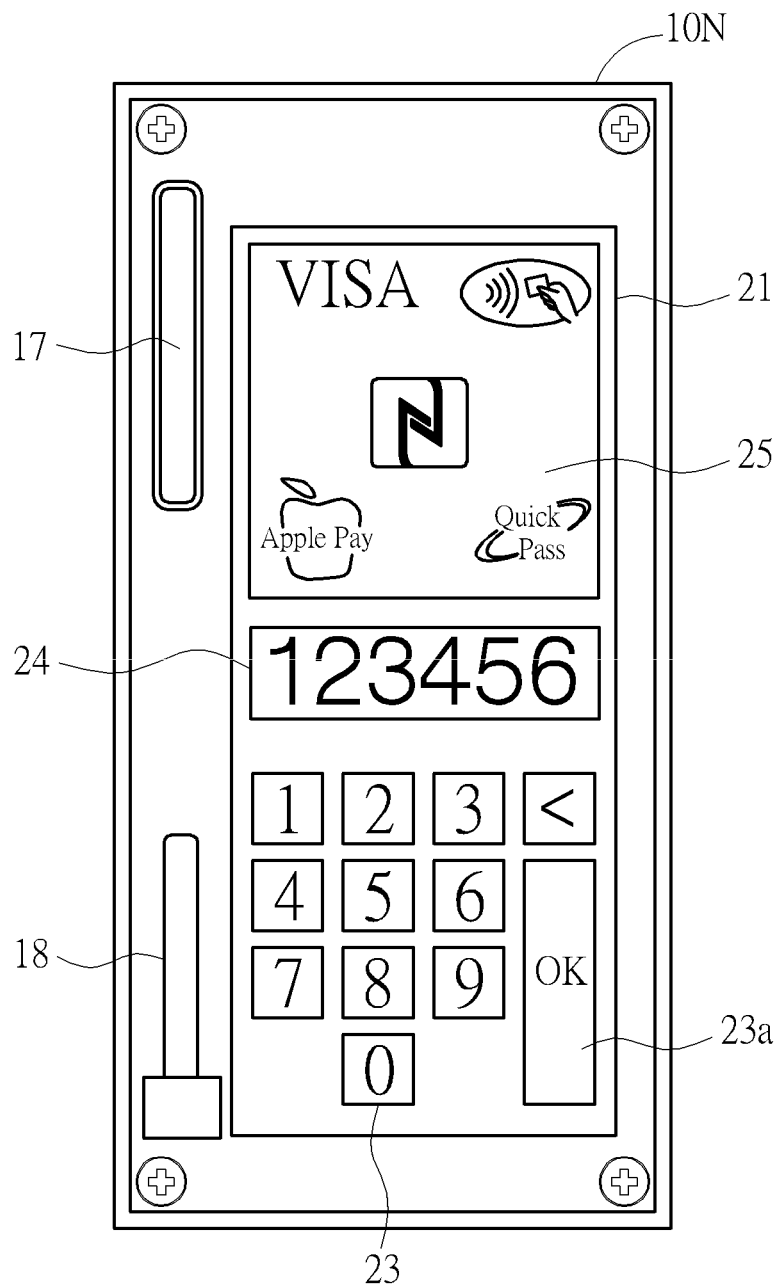
FIG. 15 is a front view of a panel device of the cloud coin slot device in FIG. 1 according to a fourteenth embodiment of the present invention.

FIG. 15 is a front view of a panel device 10N of the cloud coin slot device 8. The panel device 10N includes a screen 21. The screen 21 includes an identifier image (various payment company marks) 25, an amount window 24, a plurality of virtual control keys 23, a virtual enter key 23a, a coin slot 17, and a coin refunded device 18. The payment process and all functions of the components of the panel device 10N are similar to the panel device 10M and thus omitted here. Specifically, the virtual enter key 23a is introduced to the panel device 10N. In other words, when a user uses the plurality of virtual control keys 23 to choose an appropriate payment value, the amount window 24 displays the payment value in real-time. Then, the user can use the virtual enter key 23a to confirm the payment value. At the moment, the screen 21 displays various payment company marks 25 which support a service of near field communication-based payment. For example, the screen 21 displays Quick Pass® and Apple Pay® marks. Next, the portable device 16 with a capability of near field communication is approached to the panel device 10N by the user. The subsequent steps of the payment process of the panel device 10N are similar to the payment process of the panel device 10M. They are omitted here. Similarly, the user can ignore a step of setting a value of payment. The user can directly enable a near field communication function of the portable device 16. The panel device 10N can receive a predefined payment scheme from the portable device 16 automatically. After establishing a connection between the portable device 16 and the cloud coin slot device 8, the user can proceed to operate the payment process according to the instruction of a payment application program installed in the portable device 16. Then, the cloud coin slot device 8 receives a confirmation message of payment from the cloud server 15 through a transceiver 13 and then completes the payment process of the cloud coin slot device 8. In the panel device 10N, the plurality of virtual control keys 23 and the virtual enter key 23a are disposed on a lower side of the amount window 24. However, positions of the plurality of virtual control keys 23, the virtual enter key 23a, and the amount window 24 are not limited in FIG. 15. Further, the screen 21 of the panel device 10N can be a rectangular shaped panel device with a length equal to 100 mm and a width equal to 45 mm.

Figure 16:
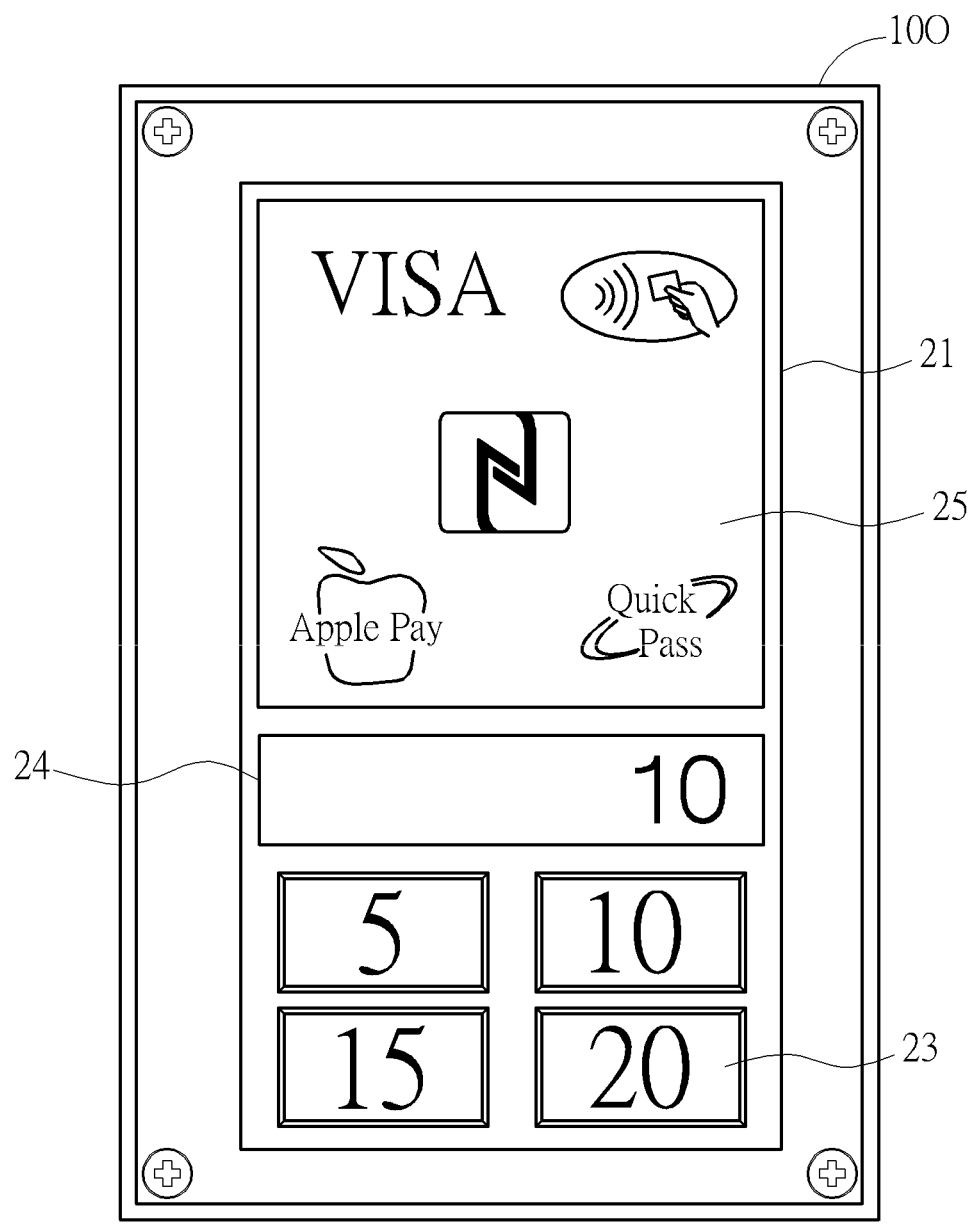
FIG. 16 is a front view of a panel device of the cloud coin slot device in FIG. 1 according to a fifteenth embodiment of the present invention.

FIG. 16 is a front view of a panel device 100 of the cloud coin slot device 8. The panel device 100 includes a screen 21. The screen 21 includes an identifier image (various payment company marks) 25, an amount window 24, and a plurality of virtual control keys 23. The payment process and all functions of the components of the panel device 100 are similar to the panel device 10M and thus omitted here. Specifically, the panel device 100 lacks a coin slot 17 and a coin refunded device 18 of the panel device 10M. Thus, the panel device 100 is incompatible with a conventional coin-inserted based coin slot device. In other words, although the panel device 100 can be implemented with a smaller panel region than the panel device 10M, it lacks of supporting a payment method of conventional coin-inserted based coin slot device.

Figure 17:
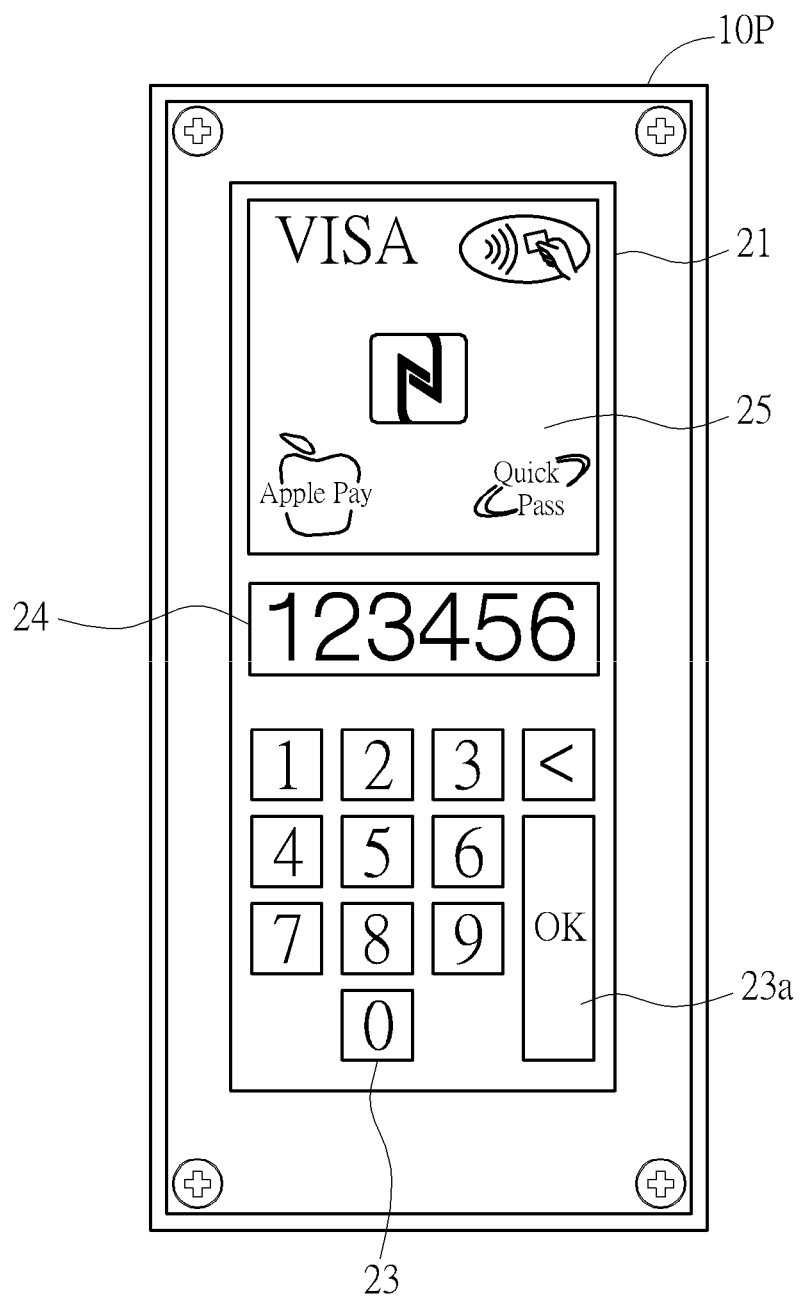
FIG. 17 is a front view of a panel device of the cloud coin slot device in FIG. 1 according to a sixteenth embodiment of the present invention.

FIG. 17 is a front view of a panel device 10P of the cloud coin slot device 8. The panel device 10P includes a screen 21. The screen 21 includes an identifier image (various payment company marks) 25, an amount window 24, a plurality of virtual control keys 23, and a virtual enter key 23a. The payment process and all functions of the components of the panel device 10P are similar to the panel device 10N and thus omitted here. Specifically, the panel device 10P lacks a coin slot 17 and a coin refunded device 18 of the panel device 10N. Thus, the panel device 10P is incompatible with a conventional coin-inserted based coin slot device. In other words, although the panel device 10P can be implemented with a smaller panel region than the panel device 10N, it lacks of supporting a payment method of conventional coin-inserted based coin slot device.

The aforementioned panel device 10A to the panel device 10P of the cloud coin slot device 8 can be categorized as follows. The panel device 10A to the panel device 10H belong to panel devices with half screen. The panel device 10I to the panel device 10P belong to panel devices with full screen. The panel device 10A to the panel device 10H (i.e., half screen) are capable of supporting on-line payment mode. The panel device 10I to the panel device 10P (i.e., full screen) are capable of supporting on-line or off-line payment mode. Specifically, the panel device 10A to the panel device 10D belong to half screen-based panel devices without near field communication and are capable of supporting on-line payment mode. They use a wireless-based transceiver or a cable-based transceiver to perform on-line payment mode. The panel device 10E to the panel device 10H belong to half screen-based panel devices with near field communication and are capable of supporting on-line payment mode. They use a wireless-based transceiver or a cable-based transceiver to perform on-line payment mode. The panel device 10I to the panel device 10L belong to full screen-based panel devices without near field communication and are capable of supporting off-line payment mode. Thus, no connection is established to a server 15. The panel device 10M to the panel device 10P belong to full screen-based panel devices with near field communication and are capable of supporting on-line payment mode. They use a wireless-based transceiver or a cable-based transceiver to perform on-line payment mode.

In other categories, the panel device 10A to the panel device 10D, and the panel device 10I to the panel device 10L belong to classic panel devices. The portable device 16 can identify a two-dimensional bar code generated from the classic panel device. The panel device 10E to the panel device 10H, and the panel device 10M to the panel device 10P belong to enhanced panel devices. Since these enhanced panel devices have near field communication module NFC, they can identify and receive payment configurations from the portable device 16 with a capability of near field communication. Further, the panel device 10A to the panel device 10P can be applied to conventional coin slot devices or conventional lottery machines. For example, the panel device 10A, the panel device 10C, the panel device 10E, the panel device 10G, the panel device 10I, the panel device 10K, the panel device 10M and the panel device 100 can be applied to conventional lottery machines. The panel device 10B, the panel device 10D, the panel device 10F, the panel device 10H, the panel device 10J, the panel device 10L, the panel device 10N, and the panel device 10P can be applied to conventional coin slot devices. Additionally, the aforementioned panel device 10A to the panel device 10P can be applied in various sizes to the conventional coin slot devices or conventional lottery machines. For example, sizes of the panel device 10A to the panel device 10P can be enlarged for displaying advertisement when they are under idle status.

In the panel device 10A to the panel device 10D, and the panel device 10I to the panel device 10L (i.e., non-near field communication based panel devices), a user uses the control keys A and B, or the virtual control keys 23 to choose or select a payment value. Then, the screen of the panel device displays a corresponding two-dimensional bar code. Then, the user can use the portable device 16 to scan the two-dimensional bar code. At the moment, an on-line payment mode or an off-line payment mode is provided by the panel device 10A to the panel device 10D, and the panel device 10I to the panel device 10L. In the on-line payment mode (i.e., supported by the panel device 10A to the panel device 10D), the cloud coin slot device 8 receives information of the payment data (i.e., for example, a confirmation message of payment) from the cloud server 15. The cloud coin slot device 8 transmits a message to a dispenser device. The dispenser device provides a corresponding product or service to the user. In the off-line payment mode (i.e., supported by the panel device 10I to the panel device 10L), the cloud coin slot device 8 verifies an authentication code inputted from the user. If the authentication code is successfully verified, the cloud coin slot device 8 transmits a message to a dispenser device. The dispenser device provides a corresponding product or service to the user.

In the panel device 10E to the panel device 10H, and the panel device 10M to the panel device 10P (i.e., near field communication based panel devices), an on-line payment mode is provided. The user can get a service or a product by using the on-line payment mode.

To sum up, the present invention discloses a cloud coin slot device. The cloud coin slot device uses various panel devices. Specifically, when the cloud coin slot device uses a half screen panel device, an on-line payment mode is provided for facilitating a third-party payment function. When the cloud coin slot device uses a full screen panel device, the cloud coin slot device provides an on-line payment mode and/or an off-line payment mode. Instead of conventional coin-inserted based coin slot device, the cloud coin slot device of the present invention provides additional payment modes and thus increases operation flexibility and convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cloud coin slot device, comprising:
   a panel device comprising:
      a screen for displaying an identifier image;
      a plurality of seven-segment displays for displaying a payment value;
      a plurality of control keys for inputting the payment value; and
      an enter key for confirming the payment value;
   a processor coupled to the panel device for processing payment data;
   a memory coupled to the processor for saving data of a payment program; and
   a transceiver coupled to the processor for receiving the payment data transmitted from a server;
   wherein the screen is configured to receive an authentication code manually inputted by a user in order to complete a payment process after the authentication code inputted to the screen is verified, the authentication code is generated by the server, and the transceiver is a wireless-based transceiver or a cable-based transceiver,
   wherein after an on-line payment mode is selected, the processor establishes connections to the server and a portable device synchronously, the portable device is configured to operate the payment process by using a payment application program installed in the portable device, and data of the payment process is accessed by the server through the processor; and
   wherein after an off-line payment mode is selected, the payment application program installed in the portable device generates the authentication code, the processor establishes connections to the portable device for receiving and verifying the authentication code, and the processor processes the payment data and generates a dispenser message after the authentication code is verified.

2. The device of claim 1, wherein the identifier image is an image of a two-dimensional bar code.

3. The device of claim 1, further comprising:
   a near field communication module coupled to the processor for sensing the portable device with a capability of near field communication.

4. The device of claim 3, wherein the identifier image includes at least one payment company mark.

5. The device of claim 1, wherein the panel device further comprises:
   a coin slot for receiving at least one coin; and
   a coin refunded device for refunding at least one coin.

6. The device of claim 1, wherein the enter key is disposed on a lower side of the plurality of seven-segment displays, and the plurality of control keys are disposed on a side of the seven-segment displays and the enter key.

7. The device of claim 1, wherein the plurality of control keys are disposed between the plurality of seven-segment displays and the enter key.

8. A cloud coin slot device, comprising:
   a panel device comprising a screen, the screen comprising:
      an identifier image;
      an amount window for displaying a payment value;
      a plurality of virtual control keys for inputting the payment value and an authentication code; and
      a virtual enter key for confirming the payment value and the authentication code;
   a processor coupled to the panel device for processing payment data; and
   a memory coupled to the processor for saving data of a payment program;
   wherein the screen is configured to receive the authentication code manually inputted by a user in order to complete a payment process after the authentication code inputted to the screen is verified, and the authentication code is generated by a server;
   wherein after an on-line payment mode is selected, the processor establishes connections to the server and a portable device synchronously, the portable device is configured to operate the payment process by using a payment application program installed in the portable device, and data of the payment process is accessed by the server through the processor; and wherein after an off-line payment mode is selected, the payment application program installed in the portable device generates the authentication code, the processor establishes connections to the portable device for receiving and verifying the authentication code, and the processor processes the payment data and generates a dispenser message after the authentication code is verified.

9. The device of claim 8, wherein the identifier image is an image of a two-dimensional bar code.

10. The device of claim 8, wherein the plurality of virtual control keys and the virtual enter key are disposed on a lower side of the amount window.

11. The device of claim 8, further comprising:
a near field communication module coupled to the processor for sensing the portable device with a capability of near field communication.

12. The device of claim 11, wherein the identifier image includes at least one payment company mark.

13. The device of claim 8, wherein the panel device further comprises:
a coin slot for receiving at least one coin; and
a coin refunded device for refunding at least one coin.

14. The device of claim 8, wherein the plurality of virtual control keys are disposed on a lower side of the amount window.

* * * * *